Figure 1:
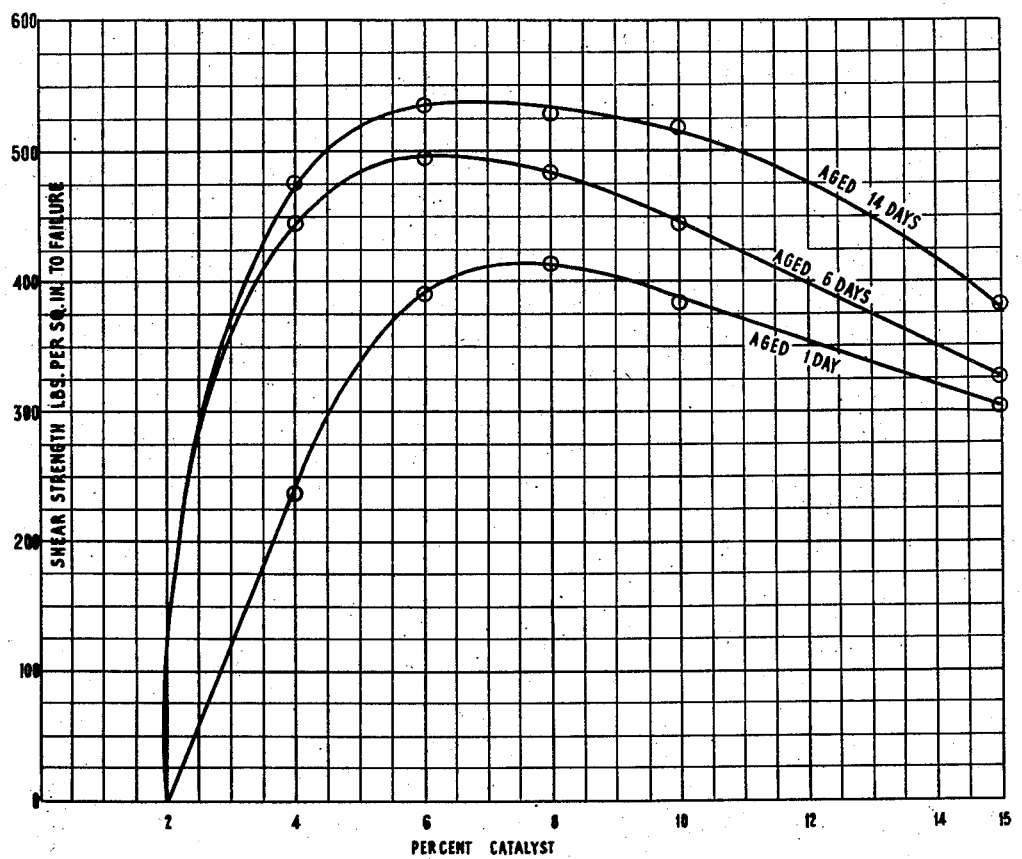

March 28, 1950  J. D. PICKENS  2,502,340

POLYAMIDE COLD BONDED LAMINATE

Filed April 6, 1944

INVENTOR.
John D. Pickens
BY
Frank C. Hilberg ATTORNEY

Patented Mar. 28, 1950

2,502,340

UNITED STATES PATENT OFFICE 2,502,340

POLYAMIDE COLD BONDED LAMINATE

John D. Pickens, Metuchen, N. J., assignor to E. I. du Pont de Nemours & Company, Wilmington, Del., a corporation of Delaware Application April 6, 1944, Serial No. 529,832

6 Claims. (Cl. 154—138)

This invention relates to laminated products and more particularly to improvements in plywood and its manufacture.

A variety of materials have been proposed for use as adhesives in bonding different types of materials together. Some of these have been used commercially but they possess certain disadvantages. Some of the known adhesives are thermoplastic, for example, linear vinyl polymers or synthetic linear polyamides, and if bonded structures containing this type of adhesive are exposed to temperatures above the softening point of the adhesives, the entire structure fails. Other adhesives are thermosetting and do not soften at elevated temperatures, but these have other disadvantages. Among these disadvantages may be mentioned (1) cold-bonding adhesive solutions are relatively unstable and must be used within a few hours and in some cases almost immediately after they are made up, (2) with relatively stable adhesive solutions high curing temperatures are required to obtain satisfactory setting of the adhesive, (3) the amount of adhesive required to obtain satisfactory bond strength is rather critical and in some cases is excessively high, (4) when such adhesives are applied to wood, the wood must be conditioned to a certain critical moisture content in order to obtain maximum bond strength, and (5) the cured adhesive layer is quite brittle and when used in the manufacture of plywood it is not flexible enough to permit bending the coated plywood veneer around small radii of curvature without breakage. Other types of adhesives have satisfactory bond strength when dry but are water-sensitive and hence unsuitable for uses where the bonded materials are exposed to moisture. These defects in the previously used bonding materials are particularly serious in the manufacture of plywood.

This invention has as an object the production of new and useful laminated products. A further object is the manufacture of new and valuable laminated articles in which at least one of the laminae is a polymeric organic material having a substantial number of hydrogens attached to nitrogen, oxygen or sulfur, i. e., the lower nonmetallic elements from groups V and VI of the periodic table, particularly cellulosic or other hydroxyl-containing material. A further object is the production of a new and improved molded plywood product. Another and primary object is the provision of an adhesive composition which may be employed as a cold-bonding medium for joining surfaces, that is, high joint strengths between laminae are developed at or about room temperature without the application of external heat. Another object is the provision of a cold-bonding adhesive composition which is stable for sufficient time to permit practical and economical operations in the manufacture of laminae such as plywood. Another object is the provision of a cold-bonding adhesive composition which is converted to an infusible state without the application of external heat so that it is no longer thermoplastic when exposed to elevated temperatures whereby delamination or slippage at the glue line is avoided. Another object is the provision of a cold-bonding adhesive composition that does not require excessively long periods for conversion to the infusible, insoluble state. Still further objects reside in methods for obtaining these articles and products. Other objects will appear hereinafter.

The above objects are accomplished in the manner more fully described hereinafter which involves essentially bonding the laminae at or about room temperature with the nitrogen substituted synthetic polyamides known as N-alkoxymethyl polyamides containing a catalyst which is present in a certain critical range of proportions.

These N-alkoxymethyl polyamides contain as an integral part of the polymer chain groups of the formula

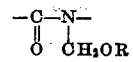

wherein R is the radical of an alcohol. These nitrogen substituted polyamides, in addition to other properties, differ from the unsubstituted polyamides in that they are thermosetting and not thermoplastic when subjected to curing conditions. They are prepared by treating a linear polyamide which has hydrogen-bearing carbon amide groups with formaldehyde and an alcohol in the presence of an oxygen-containing acid. The acid catalyst can be either an organic acid or a relatively weak inorganic acid, such as the acids of phosphorus, which have an ionization constant less than 2. The reaction can be carried out by heating at about 60° C. a solution of the initial polyamide, for example, polyhexamethylene adipamide, in solution in formic acid with a solution of para-formaldehyde in methanol, and isolating the product.

I have discovered that the N-alkoxymethyl polyamides are of peculiar utility as a cold-bonding medium for laminating polymeric organic material having a substantial number of hydrogens which are attached to a nitrogen, oxygen or sulfur, for example, hydroxyl-containing materials such as wood, paper or fibers and fabrics composed of cellulose or cellulose derivatives containing free hydroxyl groups. This is due, it is believed, to the ability of the N-alkoxymethyl polyamides to react chemically with the hydroxyl groups or other groups which contain active hydrogen of these materials to form exceptionally strong bonds between the different members of the laminated structure. The invention is carried out by applying a solution of the N-alkoxymethyl polyamide in a suitable solvent and containing from about 4 to 10% (based on weight of polymer), of an acid catalyst to the contact surfaces of the laminae by any suitable means, for example, by brushing, spraying or by means of a glue spreader. A suitable amount of the N-alkoxymethyl solution is that sufficient to give about 7 to 26 pounds of the solid polymer per 1000 square feet of the glue line. The coated surfaces are allowed to dry under ordinary atmospheric conditions for a few minutes up to an hour or more or until the solvent is substantially removed. The coated surfaces are then placed in contact and the entire assembly subjected to pressure at temperatures of about 50°–100° F. for a sufficient time to cause the bonding material to become at least partially infusible. In the case of plywood made from thin veneer, the plies may be pressed at a pressure of 40–200 lbs./sq. in. for about 5 to 20 hours. For most utilities, it is desirable to allow an aging period of from 1 day to 6 days or more before using the laminated article in order to develop maximum joint strength.

The invention is further illustrated by the following examples, in which the proportions of ingredients are expressed as parts by weight unless otherwise noted.

Example 1

| | Per cent by weight |
|---|---|
| Polyamide[1] | 29.84 |
| Denatured alcohol (23A) | 33.32 |
| Water | 14.34 |
| Maleic acid catalyst | 2.94 |
| Water | 11.76 |
| Denatured alcohol (23A) | 7.80 |
| | 100.00 |

[1] The polyamide consisted of N-methoxymethyl polyhexamethylene adipamide having a 11.0% methoxyl and about 0.5% methylol group, which corresponds to an amide substitution of about 51%.

The solution was prepared by adding small pieces of the polyamide to the alcohol-water mixture which was preheated to a temperature of about 60–65° C. This temperature and mild agitation was maintained until the polyamide was dissolved. After cooling the solution the additional alcohol and aqueous solution of catalyst was added. The catalyst content based on the solid polyamide in this example was about 10.0%.

The adhesive composition was brushed on to the surface of 1/16" birch veneer in an amount of about 20 pounds of solid polyamide per 1000 square feet of glue line. The coating was allowed to dry about 1 hour. Three of the veneer plies were then assembled with the center ply in crossgrain relationship with the outer plies and pressed at a pressure of 50 pounds per square inch for 16 hours.

The resulting plywood after 6-day aging period at room temperature tested in accordance with the procedure described in Army-Navy Aeronautical Specifications AN–NN–P–511b had a dry shear strength of 821 pounds per square inch with 53% wood failure. After the 3-hour boil test the shear strength was 436 pounds per square inch with 29% wood failure. These results are well above the minimum specification requirements of 380 pounds per square inch dry shear and 290 pounds per square inch shear strength after the 3-hour boil test.

Example 2

| | Per cent by weight |
|---|---|
| Polyamide[1] | 26.1 |
| Denatured alcohol (23A) | 43.5 |
| Water | 17.4 |
| Maleic acid | 2.6 |
| Water | 10.4 |
| | 100.0 |

[1] The polyamide used in this example was N-isobutyoxymethyl polyhexamethylene adipamide.

The preparation of the polyamide solution and the addition of the catalyst consisting of a 20% solution of maleic acid in water was in accordance with the procedure of Example 1. The finished adhesive was applied to 1/16" birch veneer by brushing in an amount of 20 pounds per 1000 square feet of glue line and allowed to dry for 10 minutes after which a plywood assembly was prepared as in Example 1. Specimens (1" x 3") of this plywood gave a dry shear strength after 6 days' aging at room temperature of 800 pounds per square inch with 100% wood failure and 383 pounds per square inch after the 3-hour boil test. These results indicate the effectiveness of cold-bonding of plywood structures with the adhesives of the present invention.

The rapid development of high shear strengths through the use of the new adhesives is illustrated by the following table which shows the results of dry shear strength tests and per cent wood failure after relatively short aging periods for other plywood specimens prepared with the Example 2 composition:

| Days Aging Period of Specimen Plywood | Dry Shear, Lbs./sq. in. | Per Cent Wood Failure |
|---|---|---|
| No aging | 405 | 0 |
| 1 | 710 | 12 |
| 4 | 867 | 70 |

Example 3

| | Per cent by weight |
|---|---|
| Polyamide[1] | 31.7 |
| Denatured alcohol (23A) | 35.4 |
| Water | 15.2 |
| Maleic acid | 1.9 |
| Water | 7.6 |
| Denatured alcohol (23A) | 8.2 |
| | 100.0 |

[1] The polyamide used in this example was the same type as shown for Example 1.

The final composition differs, however, in that the catalyst is present in an amount of 6% of the solid polyamide ingredient.

The adhesive composition was applied to 1/16" birch veneer in an amount of about 19.6 pounds per 1000 square feet of glue line by brushing and dried for 5 minutes. Plywood specimens were prepared as in Example 1. Strength tests gave results of 900 pounds per square inch dry shear with 100% wood failure after 1 day aging and after the 3-hour boil test which was carried out after an aging period of 6 days, the shear strength was 457 pounds per square inch with 35% wood failure.

*Example 4*

|  | Per cent by weight |
|---|---|
| Polyamide[1] | 30.7 |
| Denatured alcohol (23A) | 34.3 |
| Water | 14.7 |
| Maleic acid | 2.5 |
| Water | 9.8 |
| Denatured alcohol (23A) | 8.0 |
|  | 100.0 |

[1] The polyamide used in this example was the same type as shown for Example 1.

In this instance, however, the catalyst content was 8.1% of the solid polyamide ingredient.

The adhesive composition was applied to $\frac{1}{16}$" birch veneer in an amount of 15.6 pounds of adhesive per 1000 square feet of glue line and dried for 5 minutes. Plywood specimens were prepared as in Example 1. The results of strength tests were 886 pounds per square inch dry shear with 100% wood failure after 1 day aging and following the 3-hour boil test which was carried out after an aging period of 6 days, the shear strength was 484 pounds per square inch with 28% wood failure.

The preceding examples give results of shear strength tests on 3 ply plywood. In general, these values are appreciably higher than those obtained with conventional adhesive compositions. However, such tests do not fully show the extremely high joint strengths which may be developed with the new adhesives since components of stress other than shear are present in pulling these specimens. Lap joints, that is, two plies adhered in parallel grain relationship, are more nearly representative and specimens prepared in this manner using the adhesive compositions of the present invention were found to give the following results using the procedure and composition of Example 1, but using a lap joint instead of a 3 ply assembly in cross-grain relationship.

| Specimens | Shear Values | |
|---|---|---|
|  | Dry Shear, Lbs./sq. in. | Per Cent Wood Failure |
| A | 1,643 | 85 |
| B | 1,085 | 100 |
| C | 1,450 | 95 |

Another measure of the quality of a cold-bonding adhesive is the block-shear test described in Army-Navy Aeronautical Glue; Cold-Setting Resin Specification AN–G–8. In this test, two pieces of lumber stock, usually 1" thick hard maple, are glued face to face with the grain of the two pieces parallel and, after curing, are subjected to a compressive shearing force sufficient to destroy the joint. To comply with AN–G–8 specifications, it is required that the joint withstand a shearing force of 2800 pounds per square inch. Adhesive compositions of the present invention in the block-shear test were found to give the following results, using the procedure and composition of Example 1.

*Block shear tests*

| Specimen | Lbs. of Compressive Shearing Force to destroy a 3 sq. in. joint | Per Cent Wood Failure |
|---|---|---|
| 1 | 9,740 | 90 |
| 2 | 8,560 | 65 |
| 3 | 10,000 | 100 |
| 4 | 9,340 | 90 |
| 5 | 9,140 | 100 |
| 6 | 9,320 | 85 |
| Gross Average | 9,350 | 89 |
| Net Average, lbs./sq. in. | 3,116 | 89 |
| Spec. AN–G–8 | 2,800 |  |

As previously suggested, cold-bonding adhesives previously available are stable for only very short periods, that is, they must be used immediately or at least within a very few hours (less than 8 hours) after the catalyst has been added. Otherwise, there is a serious tendency to gel rendering them useless for the intended purpose and in addition considerable operating time is required for removing such gelled material from processing equipment. The cold-bonding adhesives of the invention, however, are sufficiently stable for periods of 24 hours or more for normal usage.

The improved cold-bonding adhesives are also distinguished in another important way in that high joint strengths are developed in a much shorter time than with adhesives hitherto available employed with cold-bonding methods.

In general, satisfactory results in joint strengths developed within acceptable and practical time intervals are obtained with a range of catalyst content between about 4% and 10% based on the solid polyamide although for maximum joint strengths, a range of catalyst content between 6% and 10% based on the solid polyamide is preferred. With the higher catalyst content indicated, the adhesive coated surfaces should be assembled under pressure within a period of about 1 hour, although with lower catalyst content within the range indicated this time may be extended somewhat.

Figure 2:
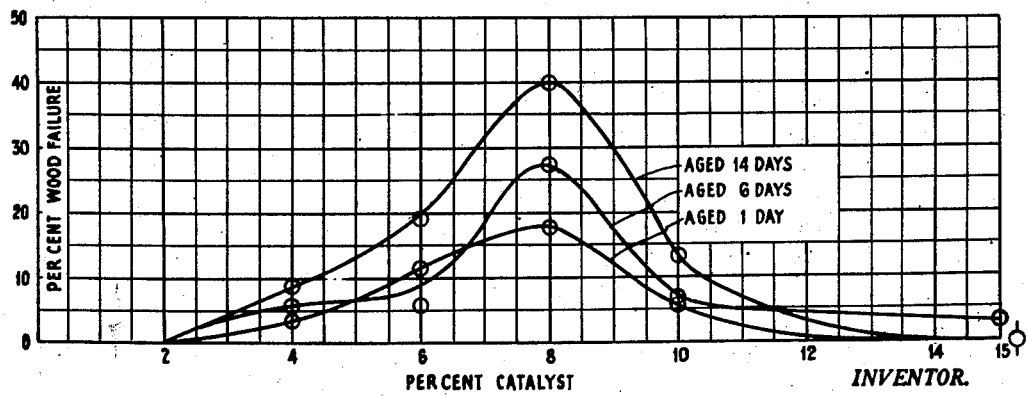

The attached drawing consists of two graphs which illustrate the critical effect of the proportion of catalyst employed in the adhesive composition on shear strength and wood failure after the 3-hour boil test at aging periods of 1 day, 6 days and 14 days on plywood specimens prepared in accordance with the procedure of Example 1 and using the composition of that example with varying catalyst contents as indicated. In Figure 1 shear strength is plotted against percentage of catalyst and shows a zero shear strength for a 2% catalyst with shear strength values increasing to a desirable point after reasonable aging at catalyst contents between 4 and 10%. At the peak shear strengths, a preferred catalyst content of between about 6 and 10% is indicated. At catalyst contents appreciably higher than about 10% there is a definite dropping off in shear strength values. Figure 2 is a graph on which percentage of wood failure is plotted against percentage of catalyst and illustrates the effect of catalyst content on wood failure. Reference to these curves clearly shows that only a narrow range of catalyst content may be employed for securing optimum results in the present invention.

As has been previously pointed out, the present invention is of peculiar utility in the production of laminated articles in which one or more of the laminae is an active hydrogen-containing material, particularly a hydroxyl-containing material since the N-alkoxymethyl polyamides actually reinforce such material by reason of the chemical action which takes place between it and the polymer. A particularly valuable embodiment of this invention, with regard to both the improved properties obtained in the product and to the practical advantages in manufacture, is the preparation of molded plywood. The initial plasticity of the adhesive is sufficient to dissipate any strains and stresses which may develop in the structure during the bonding operation, especially with curved structures. This is an important factor in obtaining the highest possible bond strength and avoids cracking and bridging of the plies in molded plywood, particularly in the preparation of curved structures. A further valuable advantage resides in the fact that the N-alkoxymethyl polyamides become infusible after curing, a reaction which is promoted by the presence of the acid catalyst in the range of proportions indicated. There is no plastic flow in the molded plywood after the polyamide has been converted. Even at temperatures as high as 180° F. molded articles show no evidence of plastic flow after curing. An additional advantage in the preparation of plywood is that the moisture content of the wood is not critical and either wet or dry conditions can be tolerated. The new adhesive compositions are of particular merit in the manufacture of massive laminated assemblies such as ships' keels and the like.

Other examples of laminae which comprise hydroxyl-containing material and which for the reasons previously given are of special utility in the practice of this invention are paper, cotton fabric, rayon, regenerated cellulose film, hydrolyzed vinyl ester polymers and interpolymers, cellulose acetate or other polymers in which there are present substantial numbers of hydrogens which are attached to oxygen, nitrogen and sulfur, such as in nylon, cellulose derivatives, polymeric thiol compounds, etc. In all of these, the active —OH, NH, and —SH groups probably enter into a chemical reaction with the N-alkoxymethyl polyamide. Although laminae consisting of materials not containing active hydrogen yield with the present polymer interlayer a weaker bond than is desired for the improved laminated wood products described herein, articles of utility can be obtained with laminae not containing active hydrogen. Examples of such laminae are leather and plastics such as polyvinyl chloride, polymethacrylates, polyvinyl acetals, etc.

The N-alkoxymethyl polyamides mentioned in the examples can be replaced by any of the large number of the polymers of this kind obtainable by reacting various alcohols in the manner previously pointed out with different polyamides containing hydrogen-bearing amide groups obtained from reactants of the kind described in United States Patents 2,071,250, 2,071,253 and 2,130,948, namely, from monoaminomonocarboxylic acids, and mixtures, in equimolecular amount, of dibasic carboxylic acid with either a diamine or a monoaminomonohydric alcohol. The polyamide from which the N-alkoxy-methyl polyamide is derived can, in addition to the hydrogen-bearing amide groups, contain non-hydrogen-bearing amide groups, as in the case of the polyamides obtained by reacting a mixture of diprimary and disecondary diamines, it being understood that these reactants can be replaced by their amide-forming derivatives. Although the N-alkoxymethyl polyamides derived from polyhexamethylene adipamide are particularly useful for the present purpose, the initial polyamide from which the N-alkoxymethyl polyamide is obtained can be that obtained from any of numerous other polyamide-forming reactants. One or more of such dibasic carboxylic acids as glutaric, pimelic, suberic, azelaic, sebacic, carbonic, 1,2-cyclohexan diacetic, para-phenylenediacetic, and diglycolic acids can, for example, be reacted with one or more of the following diamines: ethylenediamine, tetramethylene diamine, octamethylene diamine, decamethylene diamine, p-xylene diamine, triglycol diamine. Examples of suitable amino acid polyamides are those obtained from such primary monoaminocarboxylic acids as 6-amino-caproic, 12-aminostearic, and 4-aminocyclohexylcarboxylic acids. Interpolyamides are also valuable for making derivatives suitable for use in this invention. Typical are those which can be made from a mixture of the just cited polyamide-forming compositions, e. g., from a mixture of two diprimary diamines with one or more dibasic carboxylic acids. Other interpolymers are those obtained by reacting a polyamide-forming composition with another polymer-forming composition, e. g., a polyester forming composition.

The alkoxy groups in the N-alkoxymethyl polyamides can be derived from a variety of alcohols, for example, ethanol, propanol, butanol, cyclohexanol, furfuryl alcohol, methoxymethyl alcohol, beta-ethoxyethanol, octyl alcohol, lauryl alcohol, benzyl alcohol, unsaturated alcohols such as allyl alcohol and oleyl alcohol, alcohols containing additional functional groups such as methyl glycolate and ethanol formamide, di- and polyhydric alcohols such as ethylene glycol and glycerol, and ethyl chlorohydrin.

The N-alkoxymethyl polyamides used in the practice of this invention can vary somewhat widely in degree of substitution which for optimum results will depend on the specific alkoxy group in the polymer. With N-methoxymethyl polyhexamethylene adipamide, derivatives in which more than about 30% of the amide groups are substituted are suitable for the present purpose. Derivatives of less than 30% substitution are less satisfactory because they have poorer solubility in common solvents and they give inferior water-resistance in the bond. The preferred degrees of substitution are from 45 to about 55%. These substituted polyamides in this range in general have preferred solubility, stability of solution, and thermosetting properties. N - methoxymethyl polyhexamethylene adipamides of 30–45% substitution give satisfactory bonding but their solutions are relatively unstable, that is, they tend to gel rapidly at ordinary temperatures. N - methoxymethyl polyamides of more than 55% substitution can also be used, but they are harder to isolate from their reaction mixtures. With higher alkoxymethyl polyamides, somewhat lower degrees of substitution are satisfactory. For example, a N-ethoxymethyl polyhexamethylene adipamide having 36% of its amide groups substituted is just as effective in bonding action as a N-methoxymethyl polyhexamethylene adipamide of 50% substitution. However, N - ethoxymethyl polyhexamethylene adipamides of about 20–32% substitution form unstable solutions.

The N-alkoxymethyl polyamides as customarily prepared also contain some hydroxymethyl radicals on the amide groups. It is preferred that the proportion of hydroxymethyl groups be relatively small. For example, N-methoxymethyl polyamides containing a ratio of 7 methoxymethyl groups to 1 hydroxymethyl group have been found suitable in the practice of this invention but it is preferred that the ratio be of the order of 20:1. The amount of hydroxymethyl substitution of the amide nitrogen atoms is included in the values of total amide substitution mentioned in the preceding paragraph.

N-alkoxymethyl polyamides of both high and low viscosities give uniformly excellent bond strength in plywood. Therefore, any viscosity which gives a coating composition of suitable working characteristics when applied on the contact surfaces of the materials to be bonded is suitable.

Catalysts for the curing of the N-alkoxymethyl bonding material can be acids or acid-reacting salts. The preferred catalysts are acids having ionization constants equal to or greater than $1 \times 10^{-2}$ at 25° C. Acids having ionization constants of $2 \times 10^{-4}$ or even lower can be used but they are not as effective. Examples of suitable acids are maleic, p-toluene sulfonic, phosphoric, oxalic, and trichloroacetic acids. The preferred concentrations of these catalysts are from about 6 to 10% of the weight of the N-alkoxymethyl polyamide. With weak acids such as sebacic or adipic acid, higher concentrations, higher temperatures of curing, or longer times of curing are used to obtain satisfactory bonding. When the bonding material is to be applied to wood it is preferred that the catalyst impart to the solution a pH of not less than about 2. Examples of salts which are effective as catalysts are ammonium chloride, monosodium phosphate, sodium bisulfate, or others having an acid reaction in aqueous solution. Acid esters such as ethyl acid phosphate can also be used.

The moisture content of wood to be bonded with N-alkoxy-methyl polyamides is not critical. Uniformly excellent bond strengths are obtained with wood containing from 3 to 25% moisture. However, when wood of high moisture content, e. g., 25%, is used it is necessary to use a slightly higher concentration of catalyst, or longer curing time than when wood of lower moisture is used.

The bonding solution can be prepared with any solvents known for the N-alkoxymethyl polyamide. The preferred solvent will depend on the degree of substitution of the polymer and the type of substituent group. Aqueous ethyl alcohol of about 70 to 80% concentration has been described in the examples. Other concentrations ranging from 60 to 100% ethyl alcohol can also be used with certain polymers. The ethyl alcohol can be replaced by aqueous methanol, propanol, or butanol as desired. Chloroform-alcohol mixtures can also be used for N-alkoxymethyl polyamides of a high degree of substitution.

The concentration of the binding solution can be varied within wide limits which depend on the type and viscosity of the N-alkoxymethyl polyamide and the method to be used in applying the adhesive solution. Concentrations ranging from 15 to 40% solids can be used. It is preferred, however, to use a solution of high solids content such as 25 to 35% so that sufficient solids can be applied in one coat to the surfaces to be bonded to yield a solid film of about 12 to 20 lbs. of adhesive per 1000 sq. ft. of glue line.

The amount of solid bonding material necessary to obtain satisfactory bonding of plywood may be varied widely. Uniformly high bond strengths have been obtained with N-methoxymethyl polyhexamethylene adipamide solutions which have been applied at the rate of 7 to 26 lbs. of solid polyamide per 1000 sq. ft. of glue line. However, for economical reasons it is preferred to use the smallest amount of the bonding material which will give suitable bond strength. When inert diluents or fillers are also present even smaller amounts of alkoxymethyl polyamide adhesives are effective in forming excellent bond strength.

The N-alkoxymethyl polyamides can be used as the bonding medium in other form than in solution. A preformed film of polymer may be placed between the contact surfaces of the articles to be bonded. Another method of application is to coat or impregnate paper, regenerated cellulose film, or a fabric with the N-alkoxymethyl polyamide solution, evaporate the solvent, and use the dried, coated or impregnated sheet or fabric in the same manner as a film of the polymer. In this method the paper or fabric may be coated or impregnated with the adhesive solution containing the catalyst or the catalyst can be applied by spraying or other means to the dry impregnated paper or fabric prior to use.

The N-alkoxymethyl polyamide bonding material can be modified by the incorporation of other polymeric materials or various extenders or diluents in varying proportions. For example, walnut shell flour, mica flakes, wood flour, shellac, damar gum, or other similar materials may be incorporated in the bonding solution as extenders or diluents. Examples of other polymeric materials which can be incorporated with the alkoxymethyl polyamide are the following: phenol-formaldehyde resins of various types, certain alkyd resins such as linseed oil modified or castor oil modified, butanol modified urea-formaldehyde resins, mixed glycerides of unsaturated fatty acids and beta-furylacrylic acid, hydrolyzed ethylene-vinyl acetate interpolymers (either partially or completely hydrolyzed), polyvinyl butyral resins, styrene-maleic anhydride resin, terpene-maleic anhydride resins, sulfonamide-formaldehyde resins, bismethoxymethylurea, and rosin-containing materials. These materials can be used in various proportions depending on the compatibility of the particular modifier being used and the properties desired in the final adhesive.

From the foregoing description it will be apparent that laminated products, and particularly plywood structures both flat and molded plywood, of unusual strength can be obtained by the practice of the present invention wherein surfaces are joined by cold-bonding processes. The polyamide which comprises the essential ingredient in the new adhesive composition becomes converted to the infusible state without the use of externally applied heat in a much shorter time than commercial cold-bonding adhesives presently available, thereby avoiding undesirable thermoplastic tendencies with delamination or slippage at the glue line common to many other adhesives. The new adhesive compositions are stable for considerably longer periods than adhesives used heretofore in cold-bonding processes, thus contributing to more economic and flexible operating practice.

As many apparently widely different embodiments of this invention may be made without

I claim:

1. A laminated product comprising a plurality of cellulosic laminae bonded by a composition containing a N-alkoxymethyl polyamide obtained by heating a linear polycarbonamide which has hydrogen-bearing amide groups as an integral part of the polymer chain and in which the average number of carbon atoms separating the amide groups is at least two, with formaldehyde and an aliphatic monohydric alcohol in the presence of an oxygen-containing acid until 30 to 55% of the said hydrogen bearing amide groups have been reacted; and an acid reacting catalyst having an ionization constant greater than $1 \times 10^{-2}$ at 25° C. in amount between about 4% and 10%, based on the weight of the solid polyamide.

2. The laminated product of claim 1 in which the said polyamide is N-alkoxymethyl polyhexamethylene adipamide.

3. The laminated product of claim 1 in which the catalyst is maleic acid.

4. The product of claim 1 in which the laminae are wood.

5. The process for laminating cellulosic sheets which comprises coating the contacting surfaces thereof with an adhesive composition comprising a N-alkoxymethyl polyamide obtained by heating a linear polycarbonamide which has hydrogen-bearing amide groups as an integral part of the polymer chain and in which the average number of carbon atoms separating the amide groups is at least two, with formaldehyde and an aliphatic monohydric alcohol in the presence of an oxygen-containing acid until 30 to 55% of the said hydrogen bearing amide groups have been reacted and an acid reacting catalyst having an ionization constant of at least $1 \times 10^{-2}$ at 25° C. in amount between about 4% and 10% of the said polyamide, pressing the articles together with the adhesive coated surfaces in direct contact at a temperature below about 100° F. until the polyamide is at least partially converted to the infusible state.

6. The process of claim 5 in which the polyamide is N-alkoxymethyl polyhexamethylene adipamide and the catalyst is maleic acid and the sheets are pressed together at a temperature between 50° F. and 100° F. for a period between 5 and 20 hours.

JOHN D. PICKENS.

REFERENCES CITED

The following references are of record in the file of this patent:

UNITED STATES PATENTS

| Number | Name | Date |
| --- | --- | --- |
| 1,019,407 | Baekeland | Mar. 5, 1912 |
| 2,132,671 | Bauer | Oct. 11, 1938 |
| 2,191,367 | Carothers | Feb. 20, 1940 |
| 2,244,184 | Austin | June 3, 1941 |
| 2,325,700 | Moss | Aug. 3, 1943 |
| 2,356,290 | Wendler | Aug. 22, 1944 |
| 2,393,972 | Cairns | Feb. 5, 1946 |
| 2,412,993 | Larchar | Dec. 24, 1946 |
| 2,413,697 | Edgar | Jan. 7, 1947 |
| 2,414,415 | Rhodes | Jan. 14, 1947 |
| 2,430,923 | Foster | Nov. 18, 1947 |
| 2,443,486 | Watkins | June 15, 1948 |
| 2,456,271 | Graham | Dec. 14, 1948 |